3,408,404
DIOLS OF POLY(GLYCIDYL ETHER)S
Edwin J. Vandenberg, Foulk Woods, Del., assignor to Hercules Incorporated, a corporation of Delaware
No Drawing. Continuation-in-part of application Ser. No. 298,434, July 29, 1963. This application Oct. 20, 1965, Ser. No. 499,003
7 Claims. (Cl. 260—611)

This application is a continuation-in-part of my copending application, Serial No. 298,434, filed July 29, 1963, and now Patent No. 3,337,487.

This invention relates to new high molecular weight dihydroxy polyethers, and more particularly to diols of certain poly(glycidyl ether)s.

It has previously been discovered that high molecular weight polyethers can be prepared by the polymerization of glycidyl ethers. However, these polymers contain at best no more than one active hydrogen end group per molecule. In high molecular weight polymers, this amount of active hydrogen concentration is so low that generally no hydroxyl can be detected.

Now, in accordance with this invention, it has been found that these high molecular weight polyethers can be cleaved to produce polyethers having a terminal hydroxyl group at each end of the polymer chain. These new hydroxyl-ended polyethers may be defined as diols of poly(glycidyl ether)s wherein each of the hydroxyls is terminal. These new diols have a number average molecular weight of from about 1,000 to about 20,000, and preferably of from about 2,000 to about 10,000. Certain of the cleaved diols of this invention are crystalline, and others are amorphous, depending on the structure of the long chain polyether which is cleaved to produce them. The diols of this invention, more specifically, are diols of poly(alkyl, cycloalkyl, or aryl glycidyl ether)s. Thus, these diols will have the formula:

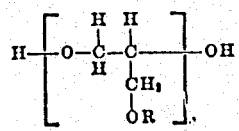

where R is an organo-substituent, and, more particularly, is an alkyl, cycloalkyl, aryl, haloaryl, or alkaryl radical containing from 1 to 20 carbon atoms. For example, R may be an alkyl radical such as methyl, ethyl, propyl, isopropyl, butyl, isobutyl, tert-butyl, neopentyl, amyl, isoamyl, hexyl, isohexyl, octyl, 2-ethylhexyl, nonyl, decyl, dodecyl, hexadecyl, octadecyl, etc.; a cycloalkyl radical such as cyclobutyl, cyclohexyl, cyclohexylmethyl, cyclododecyl, etc.; or an aryl, haloaryl or alkaryl radical such as phenyl, methylphenyl, butylphenyl, nonylphenyl, chloro-, bromo-, or iodophenyl, benzyl, phenethyl, etc.

Thus, the diols of this invention include such compositions as the diols of poly(methyl glycidyl ether), poly(ethyl glycidyl ether), poly(isopropyl glycidyl ether), poly(tert-butyl glycidyl ether), poly(neopentyl glycidyl ether), poly(dodecyl glycidyl ether), poly(octadecyl glycidyl ether), poly(cyclohexyl glycidyl ether), poly(phenyl glycidyl ether), poly(o- and p-bromophenyl glycidyl ether), poly(o- and p-chlorophenyl glycidyl ether), poly(p-methylphenyl glycidyl ether), poly(isopropylphenyl glycidyl ether), poly(p-tert-butylphenyl glycidyl ether), poly(octadecylphenyl glycidyl ether), poly(benzyl glycidyl ether), poly(phenethyl glycidyl ether), and the like.

The high molecular weight poly(glycidyl ether)s are readily cleaved by reacting the polymer with an organometallic compound of an alkali metal. The diols of this invention are obtained by treating the product of that cleavage with an aqueous acid to hydrolyze the end groups to hydroxyl groups.

The theory of this invention is illustrated by the following equations for the cleavage of poly(methyl glycidyl ether) with an organolithium compound (LiR'), wherein abstraction of hydrogens on a carbon atom beta to the ether linkage leads to cleavage. As will be seen, there are, for any given ether linkage in the polymer chain of poly(methyl glycidyl ether), three positions wherein a hydrogen is attached to a carbon beta to the ether linkage; hence, there are three possible chain cleavage reactions, two involving cleavage on the left side of the ether linkage and one involving cleavage on the right side of the ether linkage. The three cleavage reactions involving these three beta hydrogens ($\beta_1$, $\beta_2$ and $\beta_3$) are shown by Equations 1, 2 and 3 below. R represents the remainder of the polymer chain in these equations. Additionally, Equations 4 and 5 shows the types of cleavage that can occur when more than one type of beta hydrogen and both left and right side cleavages are involved. Obviously, in any one cleavage reaction there will undoubtedly take place all of these various types of cleavages. Consequently, the end product will be a mixture of these cleavage products. As will be seen from these equations, under some conditions part of the end groups in the cleavage products contain double bonds, e.g., 3-methoxy-prop-1-en-1-yl in Product A, 3-methoxy-prop-2-en-1-yl in Product B, and 3-methoxy-prop-1-en-2-yl in Product C. The 3-methoxy-prop-1-en-1-yl and 3-methoxy-prop-1-en-2-yl end groups are readily hydrolyzed to hydroxyl end groups by acid washing, as shown in Equations 9 and 10. The 3-methoxy-prop-2-en-1-yl end groups isomerize under the influence of the LiR' or LiOR present in the reaction mixture to 3-methoxy-prop-1-en-2-yl end groups which are readily converted to hydroxyl end groups by acid hydrolysis. Under other conditions, e.g., with excess organometallic compounds, the double bond end groups can be cleaved to convert them directly to LiO— end groups as shown by Equations 6, 7 and 8, and these LiO— end groups are readily converted to hydroxyl end groups by water washing as shown in Equation 11.

LEFT SIDE CLEAVAGE
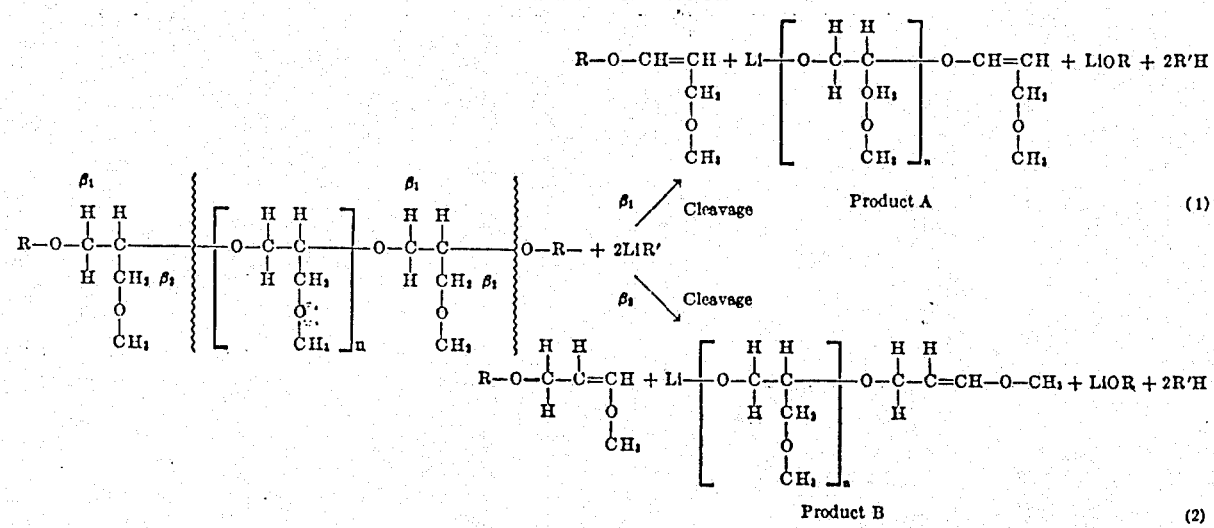
RIGHT SIDE CLEAVAGE
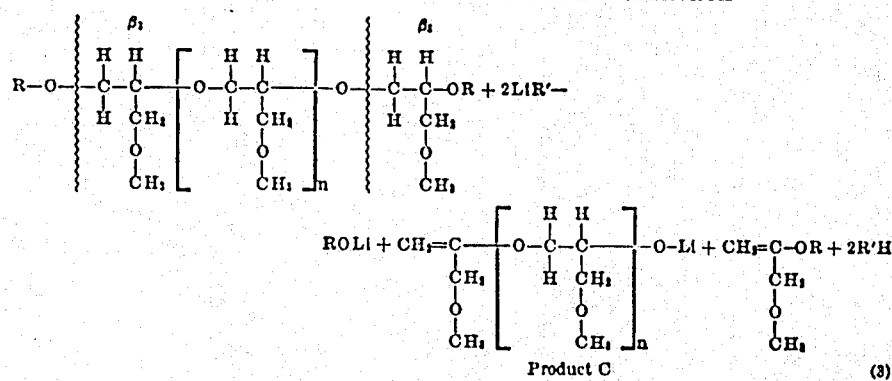
LEFT SIDE AND RIGHT SIDE CLEAVAGE INVOLVING $\beta_1$ AND $\beta_2$ HYDROGENS
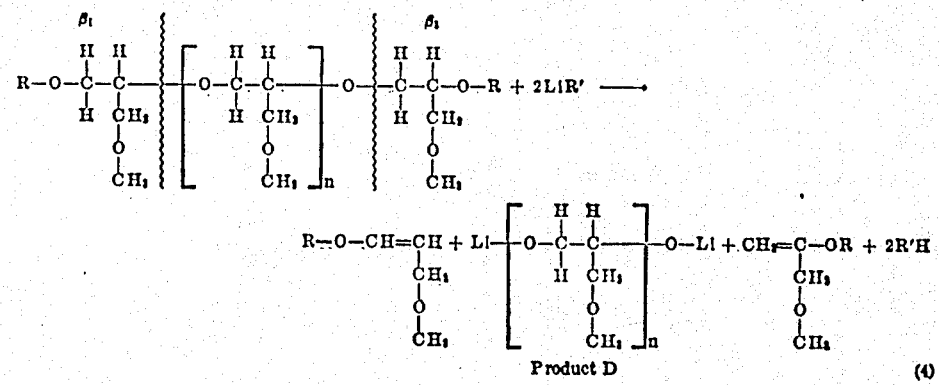
LEFT SIDE AND RIGHT SIDE CLEAVAGE INVOLVING $\beta_2$ AND $\beta_3$ HYDROGENS
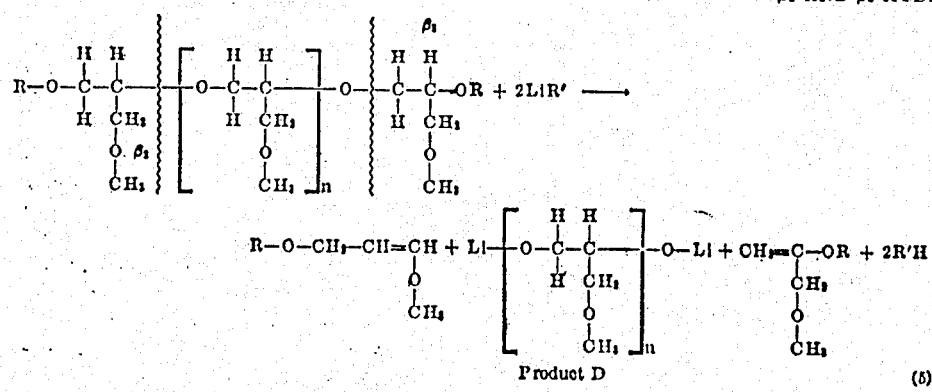

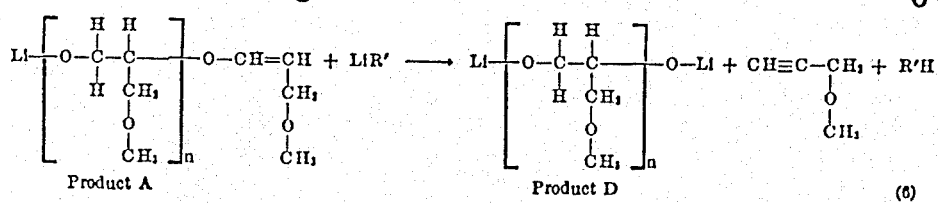

(6)

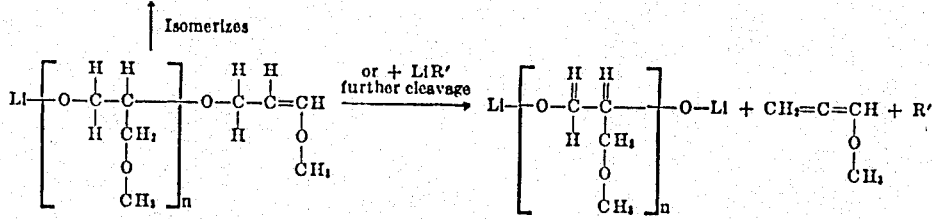

(7)

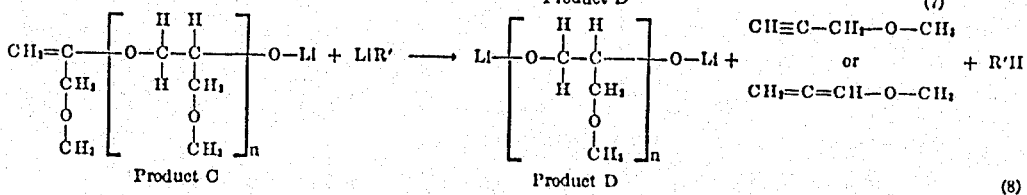

(8)

HYDROLYSIS OF PRODUCT A

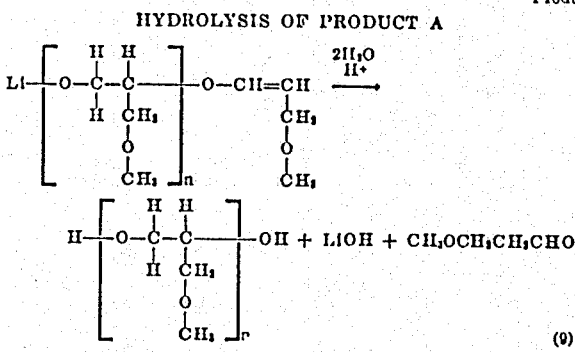

(9)

HYDROLYSIS OF PRODUCT C

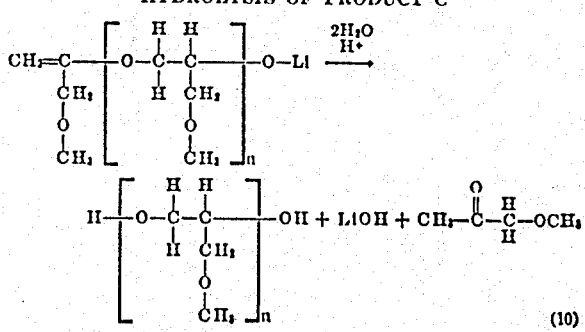

(10)

HYDROLYSIS OF PRODUCT D

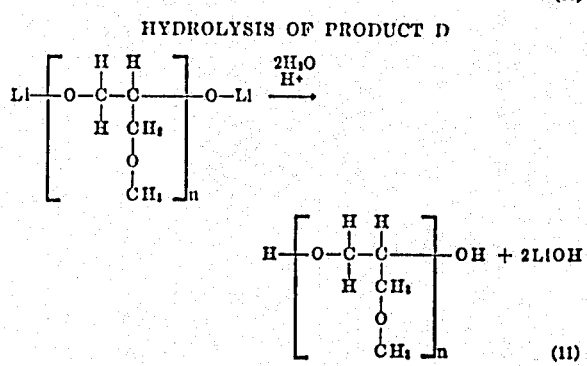

(11)

The cleavage reaction is carried out by reacting the poly(glycidyl ether) with an organometallic compound of an alkali metal. Any organometallic compound of an alkali metal, i.e., lithium, sodium, potassium, rubidium or cesium, can be used. The organo moiety will preferably be a hydrocarbon group, as for example, an alkyl, aryl, alkenyl, alkynyl, cycloalkyl, cycloalkenyl, or aralkyl, etc., group. Exemplary of the alkali metal organometallic compounds that can be used are methyllithium, ethyllithium, isopropyllithium, n-butyllithium, isobutyllithium, tert-butyllithium, amyllithium, decyllithium, octadecyllithium, cyclohexyllithium, cyclohexenyllithium, phenyllithium, naphthyllithium, vinyllithium, lithium acetylide, methylsodium, ethylsodium, propylsodium, the butyl sodiums, isopropylsodium, amylsodium, dodecyclsodium, benzylsodium, isopropenylsodium, allylsodium, octadecenylsodium, butadienylsodium, isoprenylsodium, butylrubidium, butylcesium, methyl-, ethyl-, propyl, and butylpotassium, allylpotassium, octylpotassium, phenylpotassium, cyclopentylpotassium, cyclohexenylpotassium, etc. The amount of the organometallic compound used will depend upon the amount of cleavage desired, one molecule of the organometallic being required for each cleavage, i.e., per two chain ends. Thus, the amount of organometallic compound can vary from about 1% up to a large excess, as for example, 5 to 10 times the weight of the polymer being cleaved, but preferably will vary from about 1% to about 100% by weight of the polymer being cleaved.

The cleavage reaction can be carried out in the absence of a diluent, i.e., in a bulk process, but preferably is carried out in a diluent which may be a solvent for the polymer being cleaved or which may serve only as a dispersant for the polymer. Any organic liquid diluent that is inert under the reaction conditions can be used, as for example, aromatic hydrocarbons such as benzene, toluene, xylene, etc., aliphatic and cycloaliphatic hydrocarbons such as hexane, n-heptane, cyclohexane, etc., and mixtures of such hydrocarbons, as for example, petroleum ether, gasoline, etc. Diluents that are capable of reaction with the organometallic compound or other cleaving agent, as for example, ethers, can also be used, provided the rate of reaction of the cleaving agent with the polymer being cleaved exceeds the rate of reaction with the diluent.

The concentration of the polymer in the diluent can vary from about 1% up to an essentially diluent-free system. As already mentioned, the polymer can be dissolved in the diluent, or a slurry of the polymer in the diluent can be used. Generally, it is preferred to use conditions such that the polymer solution or dispersion is stirrable. Usually the polymer concentration will be in the 2 to 50% range. As noted above, the process can be operated in the absence of a diluent, particularly in the case of polymers which on cleavage become more and more fluid, or by carrying out the process in an extruder, after which the cleaved fluid product can be handled in more conventional equipment in a continuous process.

The cleavage reaction can be carried out over a wide temperature range, generally from about −50° C. to about 200° C., depending on the reactivity of the polymer and the cleaving agent, the stability of the cleaving agent, etc. Preferably, the reaction is carried out at a temperature of from about −20° C. to about 150° C., and more preferably between about 0° C. and about 125° C. The pressure at which the reaction is carried out can be atmospheric, subatmospheric, or above atmospheric, as desired. In fact, pressures up to several thousand p.s.i. can be used if needed to keep the diluent in the liquid state.

The high molecular weight poly(glycidyl ether)s which are cleaved to prepare the products of this invention can be prepared by any desired means. These high molecular weight polyethers are readily prepared according to the process of my patent U.S. 3,135,705, issued June 2, 1964, using as the catalyst an organoaluminum compound reacted with water, and preferably with both water and a chelating agent. A typical catalyst preparation is carried out by reacting a solution of the organoaluminum compound, as for example, triethylaluminum or triisobutylaluminum, in a mixture of n-heptane and ether as solvent, with an equimolar amount of acetylacetone as chelating agent and with 0.5 mole of water per mole of aluminum, and agitating the mixture at 30° C. for 16 to 20 hours. The polymerization is typically carried out by injecting the catalyst solution so prepared into a solution of the alkyl or phenyl glycidyl ether in an inert diluent and agitating the mixture at room temperature or at elevated temperatures for several hours. Isolation of the polymer will depend on the solubility of the polymer in the reaction diluent, etc. Preparation of the high molecular weight polyethers will be further illustrated in the following specific examples.

Preferably, the poly(glycidyl ether)s that are cleaved will be of fairly high molecular weight, so that the original end groups in the polymer being cleaved are an insignificant part of the total final end groups, and the individual polymer molecules in the cleaved product will then have hydroxyl end groups on both ends. The polymer being cleaved will preferably have a chain of at least about 100 of said monomer groups, and more preferably at least about 500. The actual molecular weight of the polymer being cleaved and the number of cleavages per polymer molecule desired will, of course, depend on the purpose for which the final polymer is to be used.

The high molecular weight polymer to be cleaved can be isolated from the polymerization reaction vessel prior to the initiation of cleavage, or the cleavage reaction can be commenced in the same vessel in which the polymerization is effected without any such isolation.

To produce the diols of poly(glycidyl ether)s of this invention, the reaction product of the above described cleavage reaction must be treated to remove the alkali metal ions. This can be easily accomplished by simply washing the reaction mixture with water (basic, neutral, or acidic) or with a weak acid solution (aqueous or nonaqueous), as for example, dilute hydrochloric, formic, acetic, oxalic, sulfuric, sulfurous, nitric, sulfonic, or carbonic acids, or the like. With the aqueous acid treatment, any 3-alkoxy-prop-1-enyl, etc., end groups are hydrolyzed to the corresponding hydroxyl end groups.

The hydroxyl-ended polymers of this invention can be prepared in a wide variety of molecular weights, depending on the molecular weight of the starting polymer and the amount of cleavage to which it is subjected. In general, they are prepared with a number average molecular weight of from about 1,000 to about 20,000, and preferably of from about 2,000 to about 10,000. These products are diols, having terminal hydroxyl groups on both ends of the polymer chains. The polymeric diols of this invention can be either crystalline or amorphous, depending on the structure of the high polymer prior to cleavage. A large majority of the diols of poly(alkyl and cycloalkyl glycidyl ether)s are of amorphous structure, whereas the diols of poly(aryl, haloaryl, and alkaryl glycidyl ether)s are generally crystalline and have high melting points in the range of about 150° C. to about 200° C.

Because the diol products of this invention have hydroxyl groups at each end of their polymer chains, they can be used in various chain extension reactions. The chain extending agents can be any polyfunctional compounds which react under appropriate temperature, pressure and catalyst conditions with the hydroxyl groups. They can be di- or polyisocyanates such as m- or p-phenylene diisocyante, 2,4-toluene diisocyante, 1,5-naphthyl diisocyanate, methylene di(p-phenyl diisocyanate), hexamethylene, diisocyanate, triphenyl methane triisocyanate, etc., di- or polyepoxides such as Epon resins, as for example, the diglycidyl ether of Bis Phenol-A, or di- or triaziridines, as for example, tris[1-(2-methyl) aziridinyl] phosphine oxide, tris(1-aziridinyl) phosphine oxide, or di- or polyanhydrides such as pyromellitic anhydride, or di- or polyimides such as phenylene bis-maleimide, etc. The difunctional chain extending agents are generally used in approximately stoichiometric amounts to the active chain ends when a linear, soluble high polymer product is desired. When the chain extending agent contains more than two functional groups and is used in approximately stoichiometric amounts to the active chain ends, the product is generally a cross-linked product. Alternatively, a cross-linked network can be obtained by using a combination of a difunctional active chain end polymer with low molecular weight similar polyreactive compounds. Thus, in the case of the polymers with hydroxyls on both ends of the polymer chain, a combination with a polyol such as glycerin, pentaerythritol, trimethylol propane, sorbitol, tetrakis(2-hydroxypropyl) ethylenediamine, or ethylene oxide or propylene oxide adducts of these polyols in combination with the diisocyanate will yield a cross-linked polyurethane network.

The new diols of this invention can also be converted to useful polyester and polyamide block copolymers by the usual polyester and polyamide forming reactions, using either a simple monomeric unit such as the phthalic acids or esters, or using preformed polyesters or polyamides with appropriate reactive chain ends. Interfacial polymerization is advantageously used to prepare such materials by using chlorides of dicarboxylic acids or of carboxy-ended polyesters or polyamides with the diols. Alternatively, an amine-ended polyamide can be reacted with a chloroformate-ended diol (formed by the reaction of the diol with phosgene) to give a polyether-polyamide block copolymer joined by polyurethane links. The chloroformate in the diol can also be reacted by interfacial polymerization with hydrazine or simple diamines to form polyurethane-type products. The diols can also be end-capped, by reaction with at least two moles of a di- or polyisocyanate, to give a product with reactive isocyanate end groups, which can then be reacted with a diamine, such as hydrazine, ethylenediamine, phenylenediamine, etc., or an amine-ended polyamide, to give block-type copolymers containing urea links which are advantageous for increasing the softening point and improving the abrasion resistance of the polymer.

The crystalline diols of this invention can be further modified to yield useful products. For example, they may be reacted in the presence of a base with other epoxides such as ethylene oxide, propylene oxide, butene-1 oxide, etc. Thus, diadducts can be formed wherein the hydroxyl end groups are converted to more reactive hydroxyethyl (ethylene oxide reaction) or hydroxypropyl (propylene oxide reaction) end groups. Such products, because of their reactivity with isocyanates, are especially useful for the preparation of foams, particularly for the very useful one-shot foam process. The adducts may consist of large blocks (5 to 100 units) of ethylene oxide, amorphous propylene oxide, amorphous butene-1 oxides, etc. Such block polymers containing the diol units of this invention are unique and are unusually useful surface active agents, adhesives, and protective colloids. The ethylene oxide type are especially useful as unique detergents, dispersing agents, antistatic agents, dyeing aids, additives or coatings for fibers to prevent soil redeposition during laundering, etc.

The diols of poly(aryl, haloaryl and alkaryl glycidyl ether)s of this invention are of particular interest because of their high crystallinity and high melting points, which render them particularly useful as modifiers for flexible foams and in the preparation of rigid foams.

Still further uses for the new diol polyethers of this invention will be readily apparent to those skilled in the art from the foregoing disclosure.

The following examples illustrate the process of this invention. All parts and percentanges are by weight unless otherwise indicated. All examples were run under a nitrogen atmosphere. The molecular weight of the polymers is indicated by their reduced specific viscosities (RSV). By the term "Reduced Specific Viscosity" is meant the $\eta_{sp}/c$ determined on a 0.1% solution of a given solvent at a given temperature. The number average molecular weight (Mn) was determined in benzene (heating to dissolve the polymer when necessary) using a Mechrolab osmometer unless otherwise noted. The calculated Mn was calculated from the hydroxyl analysis assuming two hydroxyls per chain. Hydroxyl analysis was determined by infrared and/or Zerewitinoff analysis. Where the melting point of the polymer is given, it was determined by differential thermal analysis (DTA).

Example 1

A crystalline poly(phenyl glycidyl ether) was prepared by the above described general procedure, using as the catalyst a triethylaluminum—water reaction product (1/0.6 mole ratio).

One part of the above poly(phenyl glycidyl ether), having an RSV of 3.4 as measured in α-chloronaphthalene at 135° C. and a melting point of 198° C., was dissolved in 43 parts of anhydrous toluene at 150° C. The solution was cooled to 90° C. and 0.096 part of butyllithium in 0.6 part of n-hexane was added. The reaction mixture was stirred for 15 minutes, and the temperature dropped to 70° C. Then 0.4 part of anhydrous ethanol was added as a shortstop, and the reaction mixture was cooled to room temperature and washed three times with 100 ml. portions of a 10% aqueous solution of hydrogen chloride. It was washed neutral with water, and the solvent was stripped off and the polymer dried. The product so obtained amounted to 0.96 part of a slightly brown, brittle film. Infrared analysis of the product showed the presence of adout 1.8% hydroxyl groups and no unsaturation. Based on the end group analysis, this diol had an Mn of 1890.

Example 2

Isopropyl glycidyl ether was polymerized using the above-described general procedure with a triethylamuminum—0.5 mole acetylacetone—0.5 mole water reaction product as the catalyst.

Five (5) parts of this poly(isopropyl glycidyl ether) having an RSV of 4.8 as measured in cyclohexanone at 50° C. was dissolved in 110 parts of anhydrous benzene. While stirring at 30° C., 1.28 parts of butyllithium in 7.2 parts of n-hexane was added. The very viscous solution immediately became fluid. After 15 minutes, the reaction was stopped by adding 6 parts of anhydrous ethanol. The reaction mixture was then stirred for 15 minutes with 50 ml. of a 10% aqueous solution of hydrogen chloride, washed neutral with water, evaporated and dried. The product so obtained amounted to 3.4 parts (67% yield) of a viscous liquid. It had an Mn of 1080. Infrared analysis showed it to contain 2.3% hydroxyl (Mn calculated of 1480), less than 0.4% —CH=CH— groups and no carbonyl groups.

Example 3

Example 1 was repeated except that after dissolving the poly(phenyl glycidyl ether), the solution was cooled to 30° C., and then while stirring 0.19 part of butyllithium in 1.2 parts of n-hexane was added. The reaction mixture was stirred for 30 minutes at 30° C., after which the diol was isolated as described in Example 1. It amounted to 0.90 part and was a brittle solid which was shown to be crystalline by X-ray and it had a melting point of 180° C. Infrared analysis showed 2.5% hydroxyl and no unsaturation. The Mn calculated was 1360 and found was 1250.

Example 4

Cyclohexyl glycidyl ether was polymerized using as the catalyst triethylaluminum that had been reacted with 0.5 mole of acetylacetone and 0.5 mole of water per mole of aluminum.

The poly(cyclohexyl glycidyl ether), having an RSV of greater than 3 (chloroform at 25° C.), was cleaved by the procedure used in Example 2 for poly(isopropyl glycidyl ether) except that 0.34 part of tert-butyllithium in 2 parts of n-hexane was used. The product amounted to 4.5 parts and was a viscous liquid which on analysis showed 0.9% hydroxyl and no other functional groups. The Mn calculated was 3800 and found was 3600.

Example 5 o-Chlorophenyl glycidyl ether was polymerized at 0–3° C. following the above-described general procedure, using as the catalyst triisobutylaluminum which had been reacted with 0.6 mole of water per mole of aluminum.

One part of this poly(o-chlorophenyl glycidyl ether), having an RSV of 1.8 α-chloronaphthalene at 135° C.) and a melting point of 174° C., was cleaved by the same procedure as used in Example 3. The product amounted to 0.92 part of a crystalline solid having a melting point of 156° C. Infrared analysis showed 2.0% hydroxyl and no other end groups. The Mn calculated was 1700 and found was 1550.

Example 6

Octadecyl glycidyl ether was polymerized at 30° C. following the general procedure described above and using as the catalyst triethylaluminum which had been reacted with 0.5 mole of acetylacetone and 0.5 mole of water per mole of aluminum.

Five parts of this poly(octadecyl glycidyl ether), having an RSV of 3.0 (chloroform at 25° C.), was cleaved by the procedure used in Example 4 except that 0.50 part of n-hexyllithium in 4 parts of n-hexane was used. The product amounted to 4.7 parts of a waxy solid having a melting point of 80° C. Infrared analysis showed it to contain 1.6% hydroxyl and no other functional groups. The Mn calculated was 2120 and found was 1960.

Example 7

The poly(phenyl glycidyl ether) produced in Example 3 (21.2 parts) was dissolved with heating in 84.8 parts of an amorphous poly(propylene glycol) having an Mn of 2100 and the solution was mixed with 51.7 parts of tolylene diisocyanate (80:20 mixture of 2,4 and 2,6 isomers) and then heated to 120° C. over a period of 2.0 hours. To this prepolymer was added, with high speed stirring, 4.23 parts of water, 0.58 part of triethylenediamine, 0.36 part of stannous octoate, and 1.06 parts of silicone oil. Foaming then ensued, with a considerable exotherm. The resultant foam was cured 15 minutes at 100° C. It was a strong, tough, flexible, uniform cell structure foam, having better strength than a comparable foam made with just poly(propylene glycol). It had a density of 4 lbs./cu. ft.

What I claim and desire to protect by Letters Patent is:

1. As a new composition of matter, a diol of a poly(glycidyl ether), said diol having the formula

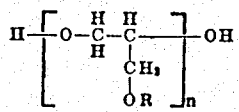

wherein R is an alkyl, cycloalkyl, aryl, haloaryl or alkaryl radical, and $n$ has a value such that the number average molecular weight of said diol is between about 1,000 and about 20,000.

2. The product of claim 1 wherein said diol has a number average molecular weight between about 2,000 and about 10,000.

3. The product of claim 2 wherein said composition is a crystalline diol of poly(phenyl glycidyl ether).

4. The product of claim 2 wherein said composition is a crystalline diol of a poly(chlorophenyl glycidyl ether).

5. The product of claim 2 wherein said composition is a diol of poly(isopropyl glycidyl ether).

6. The product of claim 2 wherein said composition is a diol of poly(cyclohexyl glycidyl ether).

7. The product of claim 2 wherein said composition is a crystalline diol of poly(octadecyl glycidyl ether).

References Cited

UNITED STATES PATENTS

| | | | |
|---|---|---|---|
| 2,327,053 | 8/1943 | Marple et al. | 260—611 |
| 2,743,285 | 4/1956 | Wilkes et al. | 260—348 |
| 2,857,417 | 10/1958 | Matter et al. | 260—615 XR |
| 3,024,219 | 3/1962 | France et al. | 260—2 |
| 3,214,390 | 10/1965 | Vandenberg | 260—615 |

FOREIGN PATENTS

| | | |
|---|---|---|
| 477,843 | 1/1938 | Great Britain. |

BERNARD HELFIN, *Primary Examiner.*

LEON ZITVER, *Assistant Examiner.*